US009289700B2

(12) United States Patent
Andreussi et al.

(10) Patent No.: US 9,289,700 B2
(45) Date of Patent: *Mar. 22, 2016

(54) COALESCENCER SEPARATOR FOR A MIXTURE OF IMMISCIBLE PHASES WITH DIFFERENT SPECIFIC DENSITY

(75) Inventors: Paolo Andreussi, Pisa (IT); Domenico Antonio Direnzo, Casirate D'adda (IT)

(73) Assignee: ENI S.P.A. (IT)

( * ) Notice: Subject to any disclaimer, the term of this patent is extended or adjusted under 35 U.S.C. 154(b) by 258 days.

This patent is subject to a terminal disclaimer.

(21) Appl. No.: 13/976,330

(22) PCT Filed: Dec. 28, 2011

(86) PCT No.: PCT/EP2011/074194
§ 371 (c)(1),
(2), (4) Date: Jul. 23, 2013

(87) PCT Pub. No.: WO2012/089786
PCT Pub. Date: Jul. 5, 2012

(65) Prior Publication Data
US 2013/0292327 A1      Nov. 7, 2013

(30) Foreign Application Priority Data

Dec. 29, 2010 (IT) ............................... MI2010A2450

(51) Int. Cl.
*B01D 17/028* (2006.01)
*B01D 17/04* (2006.01)
(Continued)

(52) U.S. Cl.
CPC .......... *B01D 17/045* (2013.01); *B01D 17/0211* (2013.01); *C10G 33/06* (2013.01); *E21B 43/385* (2013.01)

(58) Field of Classification Search
CPC ........... B01D 17/0211; B01D 17/0214; B01D 17/045
USPC ..................... 210/521, 522, 540, 802, DIG. 5
See application file for complete search history.

(56) References Cited

U.S. PATENT DOCUMENTS 1,940,762 A * 12/1933 Mahone ......................... 210/520
2,314,977 A * 3/1943 Green ............................ 210/522
(Continued)

*Primary Examiner* — Christopher Upton
(74) *Attorney, Agent, or Firm* — Tarolli, Sundheim, Covell & Tummino LLP

(57) ABSTRACT

The present invention relates to an apparatus (1) for the coalescence-separation of a mixture comprising two fluid phases mutually immiscible other and with a different specific density, characterized in that it comprises a tubular body (2) closed at opposite ends, of which, considering the apparatus in the configuration of use, one is higher than the other, at least one inlet mouth (5) of the mixture to be separated which is defined on the side surface of the tubular body (2), at least one outlet mouth (6) of the fluid phase with a lower specific density separated from the mixture which is defined close to the end of the tubular body at an upper height, at least one outlet mouth (7) of the fluid phase with a greater specific density separated from the mixture which is defined close to the end of the tubular body at a lower height and at least a set of coalescence plates (8) which is housed inside said tubular body (2), wherein each of the coalescence plates (8) has a flow plate (9) of the mixture which is tilted by an angle a with respect to a plane orthogonal to the longitudinal axis (A) of the tubular body (2) and which has a lower edge (92) facing the end of the tubular body (2) at a lower height and in fluid communication with a distribution channel (11) of the mixture to be separated, which is defined inside the tubular body (2) and is in fluid communication with the inlet mouth (5), and an upper edge (93) facing the end of the tubular body (2) at an upper height and in fluid communication with an outflow channel (12) of at least the fluid phase with a greater specific density, which is defined in the tubular body (2) and is in fluid communication with at least the outlet mouth (7) of said fluid phase with a greater specific density, and wherein the coalescence plates (8) are mutually arranged parallel and on top of each other at a defined reciprocal distance, pairs of coalescence plates (8) mutually adjacent forming a respective flow and separation channel (10) of the mixture.

19 Claims, 6 Drawing Sheets

(51) Int. Cl.
  *B01D 17/02* (2006.01)
  *C10G 33/06* (2006.01)
  *E21B 43/38* (2006.01)

(56) References Cited

U.S. PATENT DOCUMENTS

| | | | | |
|---|---|---|---|---|
| 2,570,304 A | * | 10/1951 | Bach | 210/802 |
| 2,793,186 A | * | 5/1957 | Anderson et al. | 210/521 |
| 2,960,234 A | * | 11/1960 | Fredrickson | 210/DIG. 5 |
| 3,306,456 A | * | 2/1967 | Fromson et al. | 210/521 |
| 3,847,813 A | | 11/1974 | Castelli | |
| 4,238,335 A | * | 12/1980 | Grimsley | 210/802 |
| 4,921,609 A | | 5/1990 | Fromson | |
| 4,988,441 A | * | 1/1991 | Moir | 210/522 |
| 5,028,333 A | * | 7/1991 | Wright et al. | 210/521 |
| 5,840,198 A | | 11/1998 | Clarke | |
| 7,484,627 B2 | * | 2/2009 | Lee | 210/522 |
| 2013/0313200 A1 | * | 11/2013 | Andreussi et al. | 210/708 |

* cited by examiner

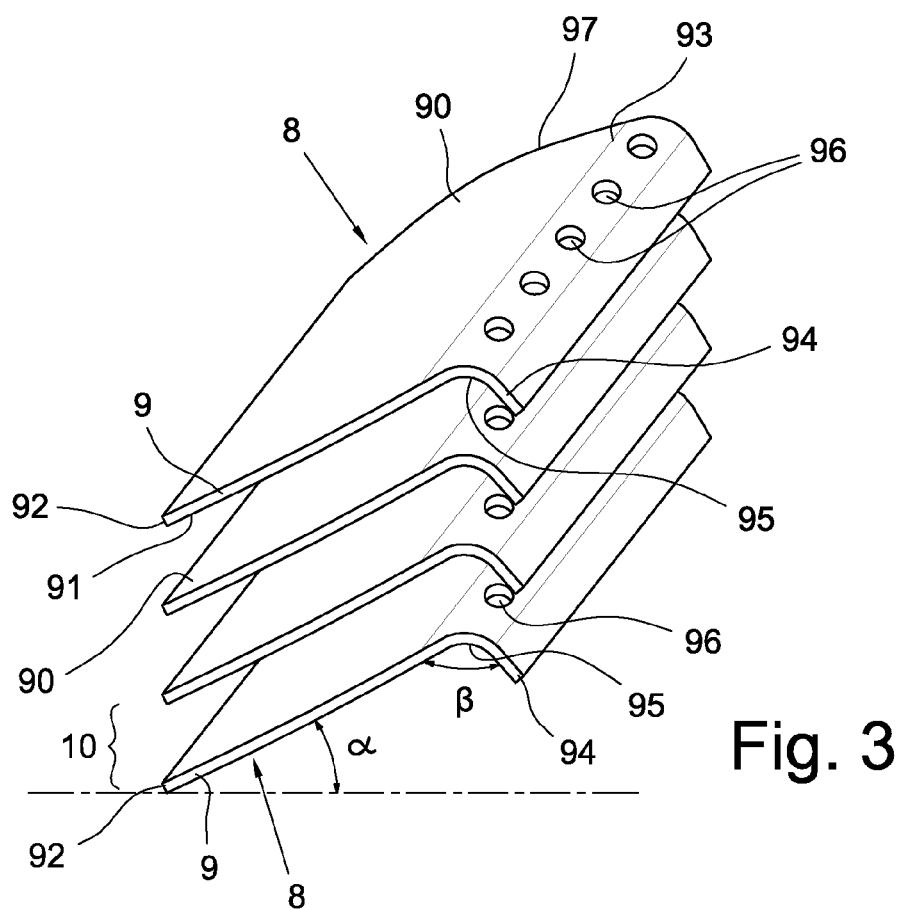

COALESCENCER SEPARATOR FOR A
MIXTURE OF IMMISCIBLE PHASES WITH
DIFFERENT SPECIFIC DENSITY

RELATED APPLICATION

This application is a National Phase filing of PCT/EP2011/074194, filed Dec. 28, 2011, and claims priority to Italian Application No. MI2010A002450, filed Dec. 29, 2010, the subject matter of which are incorporated herein by reference in their entirety.

The present invention relates to an apparatus for the coalescence-separation of a mixture comprising two fluid phases mutually at least partially immiscible and with a different specific density or gravity.

In particular, the present invention relates to an apparatus for the coalescence-separation of a mixture comprising at least one aqueous liquid phase and an organic liquid phase, the latter comprising oil (hydrocarbons) or oleophilic compounds.

The present invention can be applied, in particular but not exclusively, in the completion of oil wells for the separation of the production fluid, which is typically composed of a mixture of water and oil, both on the surface and at the well bottom.

The present invention can also be applied in wastewater treatment plants coming from industrial or civil plants, and in general, in all separation plants of a mixture comprising two fluid phases mutually at least partially immiscible and with a different specific density or gravity.

In various industrial fields, such as for example in the field of oil extraction, processing and refining in onshore or offshore plants, in the chemical industry or treatment of wastewater coming from industrial or civil plants, the separation of mixtures, whether they be properly dispersions or emulsions, of water and oil or another organic liquid phase, has for long been a significant problem from both an environmental and economic point of view.

The enforcement of increasingly severe requirements with respect to the impurities of the waste products has led to a search for and optimization of more efficient separation technologies, capable of guaranteeing that the limits established by the regulations can be reached.

With particular reference to the oil industry, it is known that the production of crude oil is often accompanied by the underground production of water present in the geological formation. The production fluid of an oil well therefore comprises a mixture of water and oil. It is consequently necessary to efficiently separate the production fluid into the two components, oil and water, so that the oil separated is substantially free of water and the water separated is substantially free of oil.

The separation of the production fluid can occur at the surface or well bottom (downhole water-oil separation), Surface separation means separation of the production fluid after this has risen to the surface.

Downhole separation means separation of the production fluid near the productive geological formation so as to obtain an organic liquid phase enriched in oil and an aqueous liquid phase enriched in water. Once the organic liquid phase has risen to the surface, it is possibly subjected to further separation treatment envisaged at the well-head before being removed from the production field. The aqueous liquid phase, on the other hand, is re-injected into the same formation. The reinjection of the aqueous liquid phase into the production formation, however, requires a high degree of purity of the same, in order not to damage the formation.

There are various separation techniques applied at the surface; among these, in particular, the technology based on the use of coalescence separators which promote the joining of oil drops (dispersed phase) dispersed in water (continuous phase) in larger-dimensioned drops which are separated into a layer which floats on the aqueous layer.

A coalescence separator typically comprises a set of coalescence plates which are arranged mutually parallel one upon the other, at a defined distance, so that pairs of adjacent coalescence plates define a separation space through which the mixture to be separated flows.

A typical coalescence separator is described in GB 2 116 060 and comprises, in succession, a gravitational separation area, a coalescence separation area and a final filtration area.

Coalescence separators of the type comprising a tank which extends horizontally or vertically and in which one or more sets of coalescent plates are housed, are also known from WO88/06478, U.S. Pat. No. 4,722,800, U.S. Pat. No. 6,907,997, U.S. Pat. No. 6,605,244 and U.S. Pat. No. 5,928,524.

The coalescent plates can be flat or undulated, as described for example in WO88/06478, U.S. Pat. No. 6,907,997, U.S. Pat. No. 4,722,800 or U.S. Pat. No. 5,928,524; alternatively, in order to improve the separation efficiency, the coalescent plates can have a flat upper surface and an undulated lower surface so as to contemporaneously cause the separation of the phases and favour the downward flow of the solids possibly present in the mixture to be separated.

The known coalescence separators, as much as they are compact, have in any case encumbrances which are such that they can only be installed at the surface or underground.

The use of coalescence separators of the known type is therefore limited to locations where there is a sufficient availability of space, which for example is lacking in some surface applications such as offshore oil platforms. The known coalescence separators cannot even be used in applications directly at the downhole.

The separation technologies used downhole are in fact based on the use of gravity separators or alternatively hydrocyclone separators.

Gravity separators consist of a separation chamber in which the production fluid moves at a sufficiently low rate as to allow separation by gravity of the two phases. The low velocities necessary for gravity separation, however, limit the quantity of production fluid which can be treated.

Hydrocyclone separators, with one or more separation steps mutually connected in series or in parallel, typically consist of a tubular body suitably shaped, into which the production fluid is injected so as to rotate at a high velocity. The centrifugal forces which are generated as a result of the rotation imposed on the production fluid, together with the geometry of the tubular body, induce the separation of the aqueous liquid phase, which, as it is heavier, tends to go towards the outer part of the hydrocyclone, from the organic liquid phase (oil) which, as it is lighter, tends to collect in the inner part of the hydrocyclone.

Typical examples of hydrocyclone separators used at the downhole are described in U.S. Pat. No. 5,730,871, U.S. Pat. No. 6,080,312, U.S. Pat. No. 6,138,578, US 2006/0186038 or WO01/65065.

Due to the high pressure drops which take place in the hydrocyclone, however, the mixture to be separated must be fed with a pump, which causes the formation of very fine drops of the oily phase dispersed in the aqueous phase, making its separation even more difficult.

The necessity is therefore felt of availing of a separation apparatus which allows the production fluid to be efficiently separated into an aqueous liquid phase and an oily liquid phase and which can be easily applied in both surface applications, in particular all surface applications where there is a limited availability of space, such as for example, in offshore applications, and also in downhole applications.

An objective of the present invention is therefore to overcome the drawbacks indicated above of the known art by proposing a coalescence separation apparatus of a mixture comprising two fluid phases mutually at least partially immiscible and with a different specific density which has limited overall encumbrances and a simple and flexible structure, enabling it to be installed in both surface plants, in particular where there is a limited availability of space, and in downhole plants.

A further objective of the present invention is to provide a coalescence separation apparatus of a mixture comprising two fluid phases mutually at least partially immiscible and with a different specific density which has reduced production, installation and management costs and which is able to guarantee an efficient separation of the mixture into two fluid phases.

These and other objectives according to the present invention are achieved by providing a coalescence separation apparatus of a mixture comprising two fluid phases mutually at least partially immiscible and with a different specific density as specified in the independent claims.

Further characteristics of the coalescence separation apparatus of a mixture comprising two fluid phases mutually at least partially immiscible and with a different specific density are indicated in the dependent claims.

The characteristics and advantages of a coalescence separation apparatus of a mixture comprising two fluid phases mutually at least partially immiscible and with a different specific density according to the present invention will appear more evident from the following illustrative and non-limiting description, referring to the enclosed schematic drawings, in which:

FIG. 3 is a schematic view of a possible embodiment of a set of coalescence plates of the flat type according to the present invention;

Figure 1:
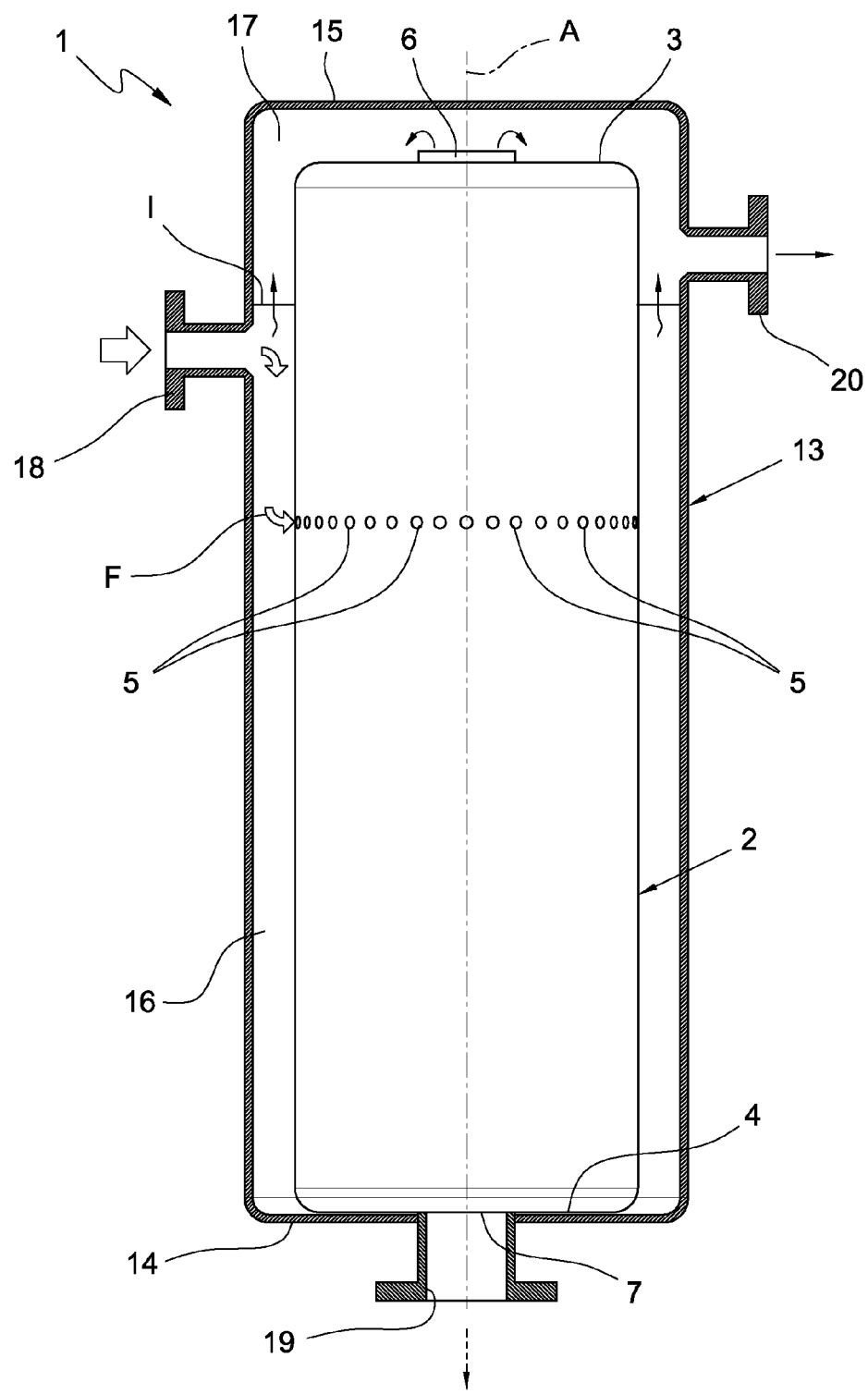
FIG. 1 is a schematic side view of a coalescence separation apparatus according to the present invention in the configuration for surface applications.
Figure 2:
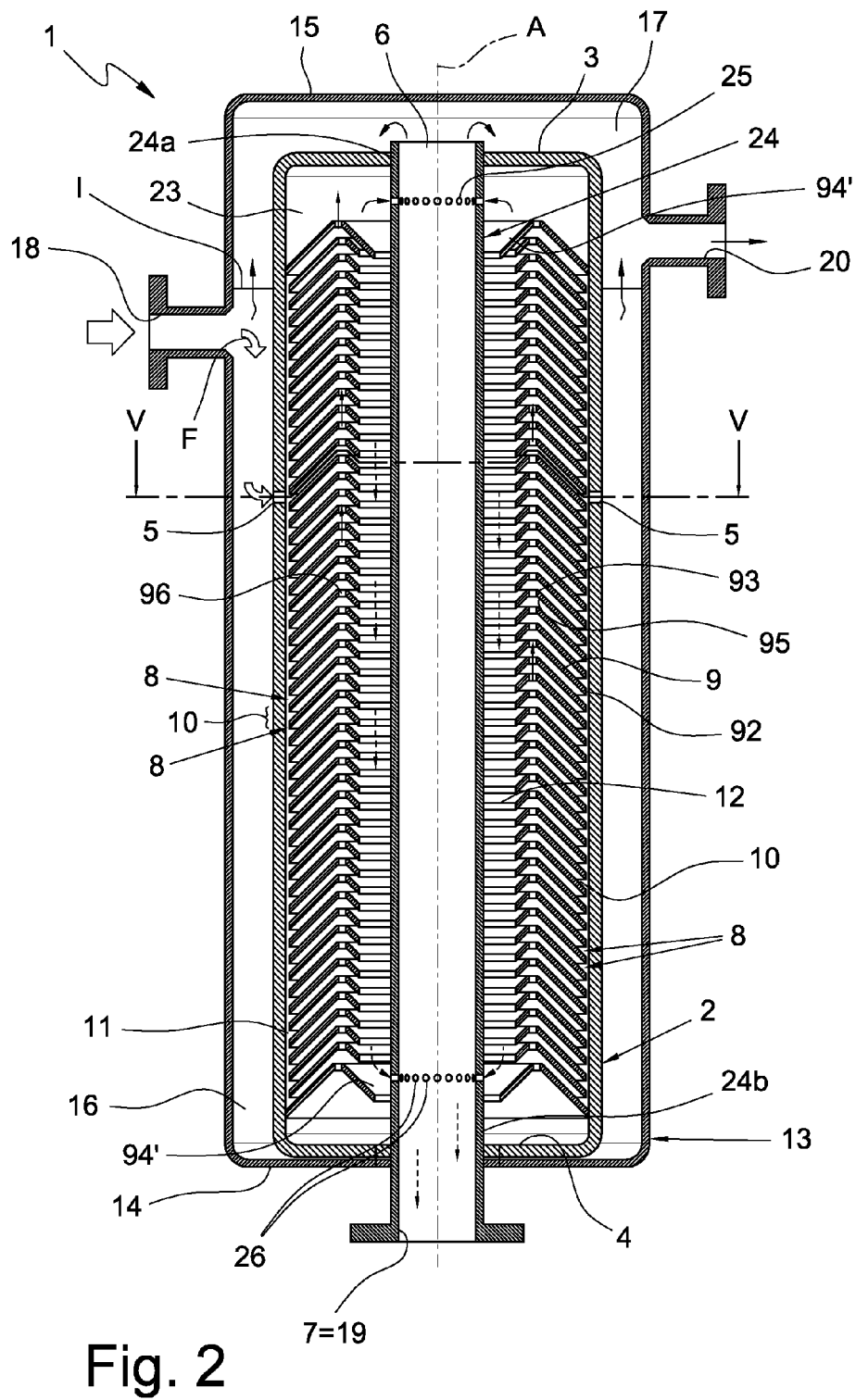
FIG. 2 is a schematic longitudinal sectional view of the apparatus of FIG. 1.
Figure 4A:
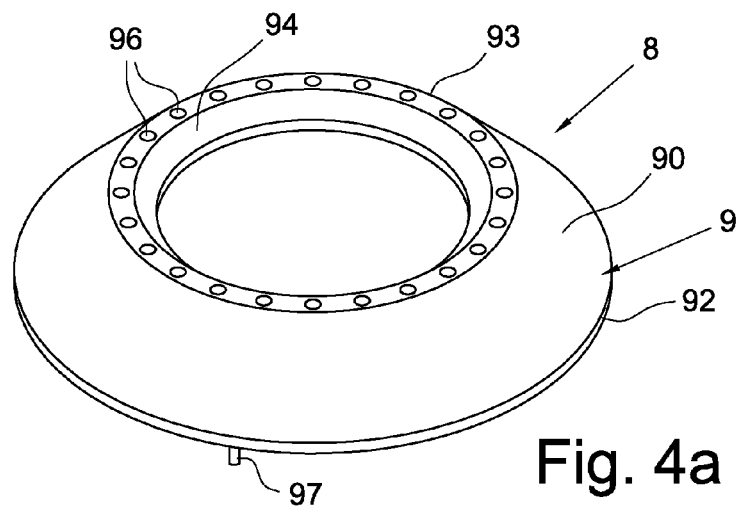
Figure 4B:
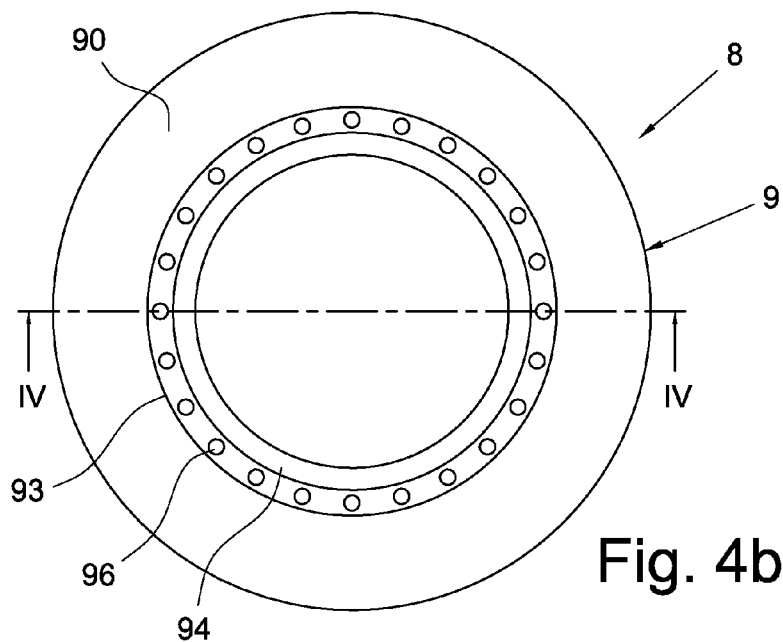
Figure 4C:
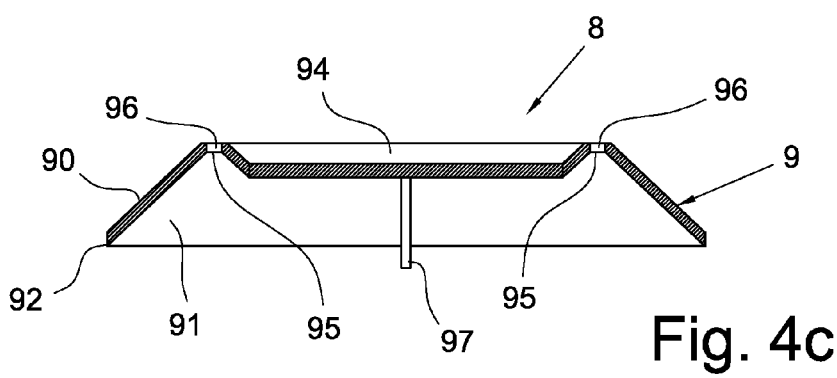
Figure 5:
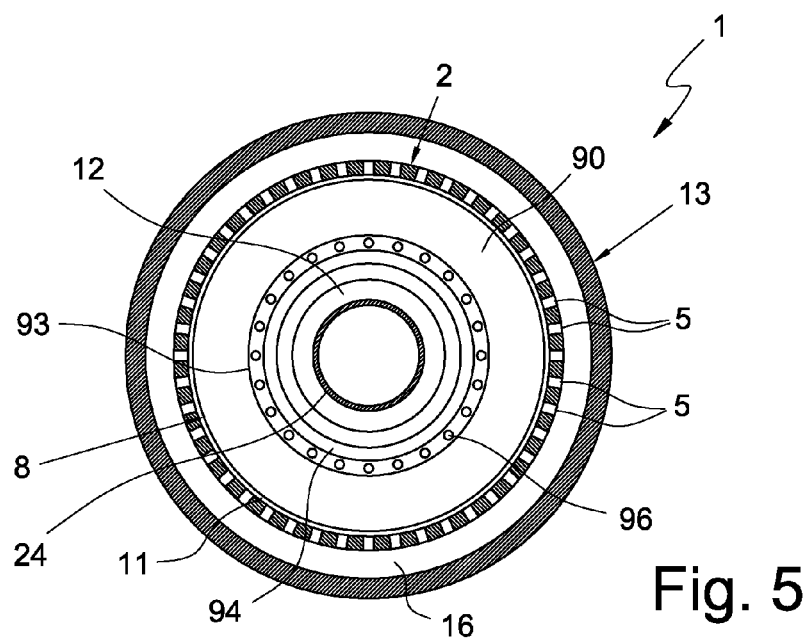
Figure 6:
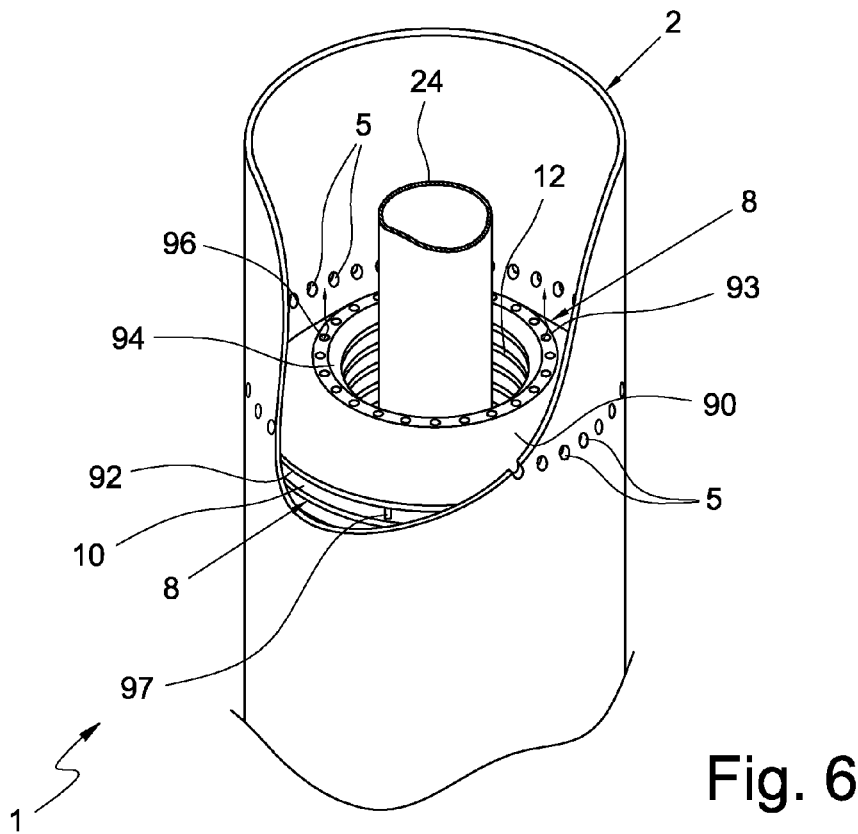
Figure 7:
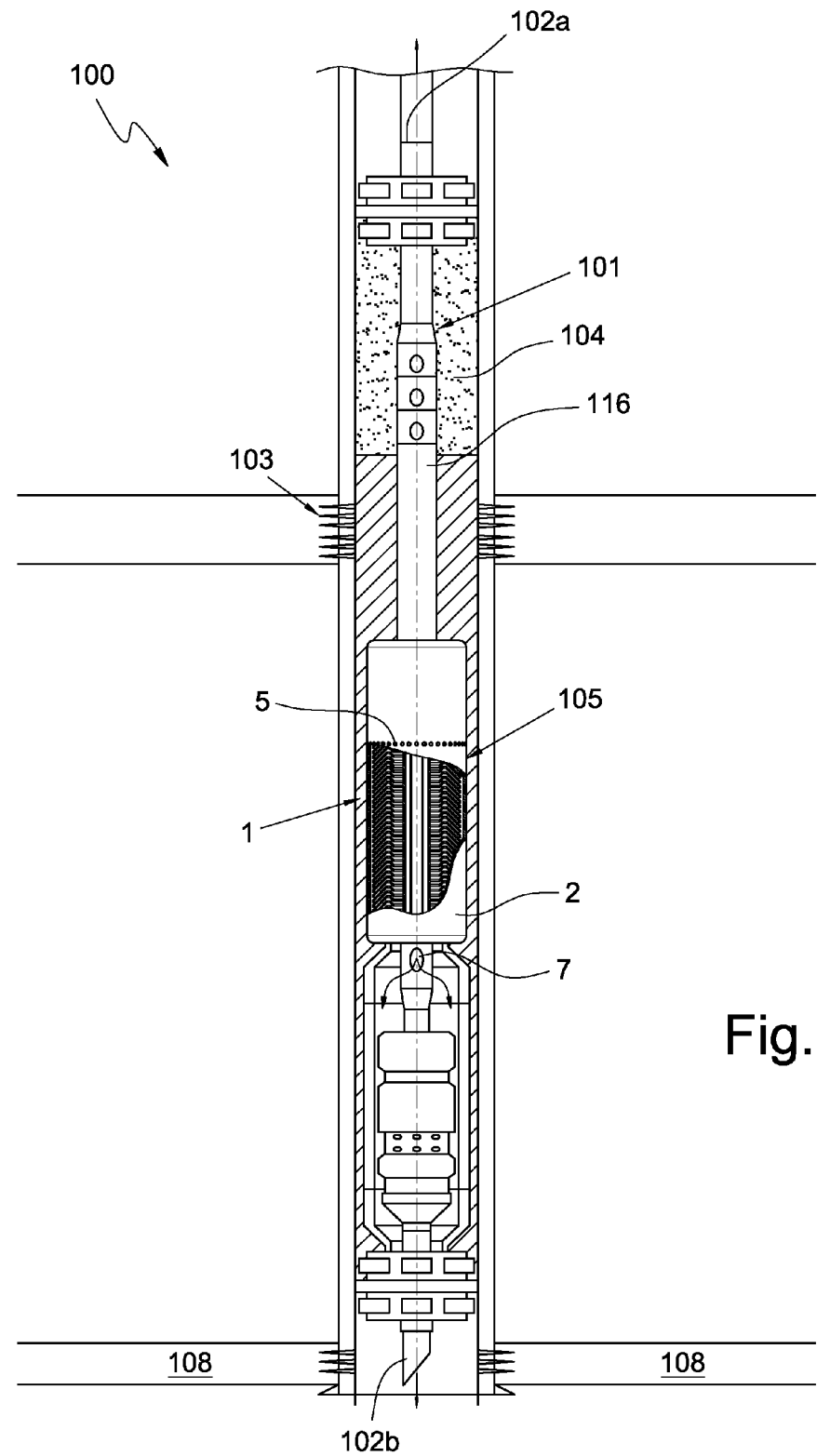

FIGS. 4a-4c schematically show, in an axonometric view, in a plan view from above and cross-section, respectively, a coalescence plate of the truncated-conical type according to a preferred embodiment of the present invention;

FIG. 5 is a schematic section according to the plane V-V of FIG. 2;

FIG. 6 is a schematic axonometric and cross-sectional view of a portion of the apparatus of FIG. 1;

FIG. 7 is a schematic and longitudinal sectional view of a coalescence separation apparatus according to the present invention in a possible downhole application.

With reference to the enclosed figures, a coalescence separation apparatus of a mixture comprising two fluid phases mutually at least partially immiscible and with a different specific density or gravity is indicated as a whole with 1.

It should be noted that, for the purposes of the present description, "mixture" also indicates a dispersion or a not stable emulsion, in which one of the two phases is dispersed in the other continuous phase, and that "fluid phases mutually at least partially immiscible" indicates two fluid phases, in particular liquid, which do not give solutions in each other at least in certain ratios.

For the purposes of the present invention, moreover, it cannot be excluded that each of the two fluid phases mutually at least partially immiscible can comprise further components, such as, for example, solid particles.

For the sake of simplicity, reference will be made hereafter in the present description to the aqueous liquid phase or water as fluid phase with a greater specific density and to the organic liquid phase or oil as fluid phase with a lower specific density, it being understood that the present invention can be applied for the separation of any two fluid phases mutually at least partially immiscible and having a different specific density.

The apparatus 1 comprises a tubular body 2 having a longitudinal axis A which, in conditions of use, is positioned vertically, as shown in the enclosed figures, or tilted with respect to the vertical, as, for example, in the case in which the apparatus 1 is installed at the downhole where the well has at least a section which develops along a sloping direction with respect to the vertical. In any case, in conditions of use, one of the two opposite ends of the tubular body 2 is at an upper height with respect to the other.

Both of the opposite ends of the tubular body 2 are closed; in particular, the end at an upper height is closed by a top 3 and that at a lower height is closed by a bottom 4.

In the embodiments represented in the enclosed figures, the tubular body 2 is cylindrical with a circular transversal section; it cannot be excluded, however, that the tubular body 2 can have a differently-shaped transversal section.

The tubular body 2 comprises at least one inlet mouth 5 of the mixture to be separated (oil and water) which is defined on its side surface. In particular, a plurality of inlet mouths 5 is envisaged, distributed along a circular crown of the tubular body 2 and each consisting of a through hole.

Close to the end of the tubular body 2 at an upper height, at least one outlet mouth 6 of the organic liquid phase separated from the mixture, is obtained, whereas close to the end of the tubular body 2 at a lower height, at least one outlet mouth 7 of the aqueous liquid phase separated from the mixture is defined.

At least one set of coalescence plates 8 is housed in the volume inside the tubular body 2, which are arranged mutually parallel and on top of each other, forming a stack. It should be pointed out that the expression "coalescence plate", known in technical jargon in the field, should not be interpreted limitatively as referring to "plate"-shaped bodies.

Each coalescence plate 8 has a flow plate 9 of the mixture which is tilted by an angle $\alpha$, with an amplitude ranging from 30° to 60°, with respect to a plane orthogonal to the longitudinal axis A, wherein with "plate" it is meant to indicate a sheet the shape of which, as it will appear clearer in the following, should not be considered as being exclusively flat and rectangular, but also shaped according to the side surface of a rotation solid.

The plate 9 has an upper side 90 which is facing the top 3 and a lower side 91 which is facing the bottom 4. Between the lower side 91 of a coalescence plate 8 and the upper side 90 of the coalescence plate immediately beneath it, a flow channel 10 of the mixture to be separated is thus defined, along which the mixture flows, separating into two components which are stratified on top of each other: a lower layer consisting of the aqueous liquid phase and an upper layer consisting of the organic liquid phase, the latter in the form of drops which, by coalescence, join to form increasingly larger drops.

Each plate 9 ends in a lower edge 92 facing the end of the tubular body 2 at a lower height and in an opposite upper edge 93 facing the end of the tubular body 2 at an upper height.

The lower edge 92 is in fluid communication with a distribution channel 11 of the mixture to be separated which is defined inside the tubular body 2, it extends in a direction substantially parallel to its longitudinal axis A and is in fluid communication with the at least one inlet mouth 5 of the mixture to be separated.

The upper edge 93, on the other hand, is in fluid communication with an outflow channel 12 of the aqueous liquid phase which is defined in the tubular body 2, it extends in a direction substantially parallel to its longitudinal axis A and is in fluid communication with the outlet mouth 7 of the aqueous liquid phase.

According to a specific feature of the present invention, the coalescence plates 8, whatever their form may be, are arranged on top of each other at a reciprocal distance ranging from 2 mm to 5 mm. This reduced spacing between two adjacent coalescence plates 8 contributes to reducing the overall encumbrance of the apparatus 1 according to the present invention, without altering the separation efficiency.

According to a further peculiar feature of the present invention, the upper edge 93 of each coalescence plate 8 extends into a lip 94 tilted with respect to the plate 9 so as to define with it a groove 95 with a concavity facing the end of the tubular body 2 at a lower height.

Said groove 95 acts as an accumulation area of the organic liquid phase before its separation and upward movement towards the respective outlet mouth 6.

In particular, the groove 95 promotes the accumulation of the drops of organic liquid phase which, when passing through the underlying channel 10, are separated from the aqueous liquid phase, and their coalescence in drops having larger dimensions which are collected therein without flowing towards the outflow channel 12 of the aqueous liquid phase.

In this way, the organic liquid phase separated is prevented from flowing into the outflow channel 12 where it should rise towards the top of the tubular body 2 flowing in countercurrent through the aqueous liquid phase separated.

The same groove 95, along with the respective lip 94, also favours the outflow of the aqueous liquid phase towards the outflow channel 12.

In particular, the angle β subtended between the lip 94, and plate 9, or rather its lower side 91, is preferably equal to 90°.

According to a further feature of the present invention, moreover, close to the upper edge 93 of each coalescence plate 8 or rather at the transition area between the lip 94 and plate 9, at least one pass-through disengage hole 96 of the organic liquid phase is defined, which has accumulated in the corresponding groove 95 and which, passing through the holes 96, flows towards the overlying channel 10 until it reaches the top of the tubular body 2 where it accumulates to subsequently flow towards the outside.

In particular, close to the upper edge 93 of each coalescence plate 8 or rather in correspondence with the transition area between the lip 94 and respective plate 9, a plurality of holes 96 which are distributed in a row along a direction substantially parallel to the profile of the upper edge 93 is obtained; along a line, in the case of coalescence plates of the flat type (FIG. 3) or along an annular crown in the case of coalescence plates of the truncated-conical type (FIGS. 4a-4c).

It is noted that, with such configuration, the organic liquid phase accumulates and is collected in the groove 95 of each coalescence plate 8 from which it then disengage, passing through the holes 96 until it rises, passing through the overlying channels 10, to the top of the tubular body 2 where it accumulates before flowing outside it. The aqueous liquid phase, on the other hand, flows towards the outflow channel 12 accompanied by the lip 94 descending towards the respective outlet mouth 7.

The coalescence plates 8 can be of the flat type as represented in FIG. 3.

One or more sets of coalescence plates 8 of the flat type can be positioned inside the tubular body 2 mutually superimposed in a single stack.

In this case, the distribution channel 11 is defined between the portion of the side surface of the tubular body 2 subtended to the lower edges 92 of the coalescence plates 8 and the same lower edges 92. The outflow channel 12, on the other hand, is defined between the portion of the side surface of the tubular body 2 subtended to the upper edges 93 of the coalescence plates 8, such same upper edge 93 and a lower height bottom 4 at a lower height.

Alternatively, two sets or two stacks of coalescence plates 8 of the flat type can be positioned adjacent to each other with the upper edge 93 facing the centre of the tubular body 2 and with the lower edge 92 at a distance from the internal side surface of the tubular body 2.

In this case, two distribution channels 11 are present, each defined by the space delimited by the internal side surface of the tubular body 2 and the lower edges 92 of the coalescence plates 8 of each of the two sets. The outflow channel 12, on the other hand, is defined at the centre of the tubular body 2 and is delimited by the upper edges 93 of the coalescence plates 8 of the two sets mutually facing and by the portions of the internal side surface of the tubular body 2 which extends between them.

According to a further peculiar feature of the present invention, each coalescence plate 8 has a truncated-conical form.

In particular, as represented in FIGS. 4a-4c, each coalescence plate 8 has a truncated-conical shape internally hollow and open at the larger base and smaller base, the plate 9 is thus defined by the side surface of the truncated cone.

The coalescence plates 8 are arranged mutually parallel forming a stack.

The set of coalescence plates 8 is housed in the tubular body 2 coaxially to it with the larger base and smaller base of the coalescence plates 8 respectively facing the end of the tubular body 2 at a lower height and the end of the tubular body 2 at an upper height.

The lower edge 92 and the upper edge 93 of each coalescence plate 8 are therefore respectively defined by the larger base and smaller base of the truncated cone and have a circular profile.

The upper edge 93 extends into the lip 94 tilted towards the inside of the truncated cone so that the groove 95 is defined between the plate 9 and the lip 94.

Along the transition area between the plate 9 and respective lip 94, composed of a flat annular surface, a crown of through holes 96 exists.

At least one ridge 97 protrudes from the lower surface 91 of each coalescence plate 8 of the truncated-conical type, which is destined for resting on the upper surface 90 of the coalescence plate 8 immediately beneath it, thus acting as a spacer.

In the embodiment illustrated, the ridge 97 has the form of a ribbing which extends along a generatrix of the cone.

As represented in FIGS. 1, 2 and 6, one or more sets of truncated-conical coalescence plates 8 are housed in the tubular body 2 so that an annular interspace, which forms the distribution channel 11, is defined between the lower edges 92 of the coalescence plates 8 themselves and the internal side surface of the tubular body 2.

The outflow channel 12, on the other hand, is defined at the centre of the coalescence plates 8 and is delimited by the upper edges 93 (smaller bases) of the truncated-conical coalescence plates 8 and by an outflow duct 24 positioned coaxially with respect to the tubular body 2, open at opposite ends 24a and 24b, of which one end 24a faces the end of the tubular body 2 at an upper height and the other end 24b faces the end of the tubular body 2 at a lower height.

The end 24a of the outflow duct 24 which faces the end of the tubular body 2 at an upper height protrudes from the top 3 of the latter defining the outlet mouth 6.

The end 24b of the outflow duct 24 which faces the end of the tubular body 2 at a lower height protrudes from its bottom 4 defining the outlet mouth 7.

The lip 94' of the coalescence plate 8 of the truncated-conical type at the top of the set, closes the outflow channel 12 above and delimits, in cooperation with the top 3 of the tubular body 2, an accumulation compartment 23 of the separated organic liquid phase.

Close to the end 24a of the outflow duct 24 facing the end of the tubular body 2 at an upper height, at least one upper hole 25, specifically a crown of upper holes 25, is obtained, through which the organic liquid phase, which has separated and collected in the accumulation department 23, flows into the outflow duct 24 and subsequently to the outlet mouth 6.

Similarly, close to the end 24b of the outflow duct 24 facing the end of the tubular body 2 at a lower height, at least one lower hole 26, specifically a crown of lower holes 26, is obtained, through which the aqueous liquid separated phase flows from the outflow channel 12 into the outflow duct 24 and from this to the outlet mouth 7.

It should be noted that the truncated-conical form of the coalescence plates 8, thanks to the radial symmetry, ensures a good functioning of the separator even when it is in a tilted position with respect to the vertical, without needing operations of direction during the installation.

Furthermore, the coalescence plates 8 of the truncated-conical type are obtained by fusion with consequent advantages in terms of production with respect to coalescence plates of the flat type obtained, on the contrary, by plate processing.

Although only one set of coalescence plates 8 housed inside the tubular body 2 is shown in the enclosed figures, in all the possible embodiments of the apparatus 1 according to the present invention, two or more sets of coalescence plates 8 can be housed inside the same tubular body 2, arranged in series with respect to each other and consequently hydraulically connected in parallel. In this way, the structure of the apparatus 1 is modular, which makes it easily adaptable to the various application requirements.

In the basic configuration, the apparatus 1 according to the present invention comprises the tubular body 2 inside which one or more sets of coalescence plates 8 are housed, as described above.

This basic configuration can also be applied to downhole separation plants, as illustrated for example in FIG. 7.

For surface applications, on the other hand, the apparatus 1 is completed by a containment tank 13 of one or more tubular bodies 2.

The tank 13 also has a tubular form, with a transversal section, preferably circular, and is closed at the opposite ends, of which one end is at a lower height with respect to the other.

With reference to the enclosed figures, in which the apparatus 1 is represented in the usual vertical configuration, the lower end of the tank 13 is closed by a bottom surface 14 and the upper end is closed by a top surface 15.

A chamber is defined inside the tank 13, in which at least one tubular body 2 is housed, whose bottom 4 rests on the bottom surface 14 of the tank 13 and whose top 3 is at a distance from the top surface 15 of the tank 13.

An annular interspace 16 is thus defined between the tank 13 and tubular body 2, above which there is a compartment 17 with a circular transversal section in which the outlet mouth 6 of the tubular body 2 flows.

The tank 13, moreover, is equipped with at least one inlet opening 18 of the mixture to be separated therein.

In particular, the inlet opening 18 is situated at a lower height with respect to the outlet mouth 6 of the organic liquid phase from the tubular body 2 and introduces the mixture to be separated into the annular interspace 16.

At least a first discharge opening 19, on the other hand, is situated on the bottom surface 14 of the tank 13, which is in fluid communication with the outlet mouth 7 of the aqueous liquid phase from the tubular body 2. In particular, the first discharge opening 19 is directly connected to the outlet mouth 7 of the tubular body 2 and can consist of an extension of the end 24b of the outflow duct 24 which is inserted so as to pass through the bottom 4 of the tubular body 2 and the bottom surface 14 of the tank 13, so that the outlet mouth 7 coincides with the first discharge opening 19 (FIG. 2).

Finally, the tank 13 is equipped with at least a second discharge opening 20 of the organic liquid phase which is in fluid communication with the chamber inside the tank 13 above the inlet opening 18 and above the interface I between the mixture introduced into the annular interspace 16 and the organic liquid phase composed of the fraction which is separated from the mixture present in the annular interspace 16 itself and from the fraction separated inside the tubular body 2 and discharged from the outlet mouth 6 of the same.

In the embodiments represented in the enclosed FIGS. 1 and 2, only one tubular body 2 is present inside the tank 13, it is possible however to arrange two or more tubular bodies 2 side by side and parallel, inside the same tank 13. Each tubular body 2 therefore can be constituted by one or more modules and can be installed alone or in combination with analogous modules inside the same tank 13, making the apparatus 1 according to the present invention even more flexible and modular.

Pumping means of the known type and not illustrated, as they do not form part of the present invention, are connected to the discharge openings 19, 20.

It should be noted that the arrangement of the pumping means downstream of the separation apparatus 1 and not, on the contrary, upstream of the same, prevents further emulsions of the organic liquid phase in the aqueous liquid phase, thus favouring the separation.

With reference to FIGS. 1 and 2, which illustrate an apparatus 1 for surface applications, the functioning of the apparatus 1 is as follows.

The mixture or, more specifically, dispersion of the organic liquid phase (dispersed phase) in the aqueous liquid phase (continuous phase) is injected through the inlet opening 18 into the annular interspace 16.

A first separation and stratification of the two phases already takes place in the annular interspace 16, of which the organic liquid phase, as it is the one with lowest specific density, tends to rise towards the surface of the mixture, stratifying above it.

The liquid aqueous phase containing still oil present in the annular interspace 16 passes through the inlet mouths 5 distributed on the side surface of the tubular body 2 entering the distribution channel 11 present inside the tubular body itself 2 (arrows F).

From here, the mixture flows along the channels 10 defined between pairs of adjacent coalescence plates 8 with a laminar movement, so that the residence time inside the channel 10 is sufficient for allowing the separation of the mixture.

During the flow of the mixture along the channels 10 from the lower edges 92 towards the upper edges 93 of the coalescence plates 8, the two organic liquid and aqueous liquid phases are separated: the organic liquid phase, in the form of drops, rises through the mixture towards the lower side 91 of the coalescence plate 8 which delimits the single channel 10 above, where, following its profile, it is joined by coalescence into drops having increasingly larger dimensions, the aqueous liquid phase, on the other hand, is separated into a lower layer which flows along the upper side 90 of the coalescence plate 8 which delimits the channel 10 below.

The organic liquid phase accumulates in correspondence with the groove 95 of each coalescence plate 8, aggregating with the organic liquid phase which rises from the underlying channels 10 through the holes 96 of the respective coalescence plates 8.

From here, the organic liquid phase is separated from the flow present in the channel 10, passing, through the holes 96, into the overlying channel 10.

The organic liquid phase which is separated from the flow present in a channel 10 and rises, through the holes 96 of the coalescence plate 8 which delimits said channel 10 above, towards the immediately overlying channel 10, encounters the aqueous liquid phase which has been separated in the latter channel 10, without however being entrained by this, thanks to the reduced flow rate.

The organic liquid phase therefore rises through the holes 96 of all the coalescence plates 8 of the set and accumulates in the accumulation compartment 23 at the top of the tubular body 2.

The organic liquid phase which is collected in the accumulation tank 23 enters the outflow duct 24 through the upper holes 25 and rises towards the outlet mouth 6 defined by the end 24a of the same outflow duct.

The organic liquid phase once out of the outlet mouth 6, it accumulates at the top of the tank 13 stratifying above the mixture introduced into it (interface I). The organic liquid phase then exits through the second discharge opening 20.

The flow of the organic liquid phase is indicated by the arrows in a continuous line.

The aqueous organic phase which is separated along the channels 10, having reached the lip 94, is accompanied by the latter, flowing into the outflow channel 12 where it descends towards the bottom 4 of the tubular body 2.

The aqueous liquid phase separated and which collects towards the bottom of the outflow channel 12, passes from this into the outflow duct 24 through the lower holes 26 and then to the outlet mouth 7 (discharge opening 19) defined by the end 24b of the same outflow duct.

The flow of the aqueous liquid phase is indicated by the arrows in a dashed line.

As already indicated, the apparatus 1 according to the present invention, in its base configuration comprising the tubular body 2 inside which one or more sets of coalescence plates 8 are housed, can be particularly applied in downhole separation plants.

A possible embodiment of this plant 100 is schematically represented in FIG. 7.

The plant 100 comprises a closed chamber 101 which develops between an upper outlet mouth 102a of the fluid phase with a lower specific density (organic liquid phase) separated from the mixture, situated at a first upper height, and a lower outlet mouth 102b of the fluid phase with a greater specific density (aqueous liquid phase) separated from the mixture, situated at a second lower height with respect to the first upper height.

An inlet 103 for the mixture to be separated, specifically consisting of production fluid, is interpositioned between the two upper and lower outlet mouths 102a, 102b. The lower outlet mouth 102b is in fluid communication with a reinjection area 108 into which the production water, suitably deoiled, is injected.

A first upper device 104 for the gross separation of the mixture and at least a second lower device 105 for the fine separation of the mixture pre-treated in the first upper device 104, are situated, in axial succession, between the upper outlet mouth 102a and the lower outlet mouth 102b, wherein the first upper device for the gross separation 104 comprises a gravitational separation chamber and the at least second lower fine separation device 105 comprises at least one apparatus 1 according to the present invention as described in the co-pending patent application in the name of the same Applicant.

The coalescence-separation apparatus, as also the set of coalescence plates, object of the present invention, although maintaining a high separation efficiency, have the advantage of having limited encumbrances, thus enabling them to be easily used both in surface installations, in particular in surface installations in which there is a reduced availability of space, as for example in offshore platforms, and also in downhole installations; in the latter case, without requiring any enlargement operations of the well hole.

In particular, the reduced spacing between adjacent coalescence plates and the numerous flow channels defined between them, allow the overall encumbrance of the separation apparatus according to the present invention to be reduced, at the same time maintaining a high separation efficiency.

The conformation of the single coalescence plates with a folded lip defining a collection and accumulation groove of the fluid phase with a lower specific density and close to which "disengage" holes of the same are defined, contributes to improve the separation efficiency and to avoid countercurrent flows of the two phases separated.

The truncated-conical form of the coalescence plates, thanks to their radial symmetry, guarantees a good separation efficiency degree even when the apparatus is positioned with a tilted axis with respect to the vertical without needing a specific direction. Furthermore, this particular embodiment allows a better exploitation of the internal volume of the tubular body and, thanks to the geometry which characterizes it, it is suitable for pressurized applications.

Finally, this particular embodiment allows coalescence plates to be produced by means of fusion, with consequent advantages in terms of production, and also facilitates assembly operations of the sets of coalescence plates.

The coalescence-separation apparatus according to the present invention can be applied to separation plants of production fluid in an oil well directly at downhole, being it compact and guaranteeing an aqueous liquid phase with a reduced content of residual organic components (oil) to be obtained, so as to be possible to reinject it into the production formation without causing a deterioration of the latter.

The particularly simple and modular structure of the coalescence-separation apparatus according to the present invention also makes it easily installable and flexible.

It is in fact possible, on the one hand, to position in the same tubular body, one or more sets (modules) of coalescence plates one upon the other forming a stack in relation to the separation requirements. It is also possible, on the other hand, to position one or more tubular bodies, each equipped in its interior with one ore more sets of coalescence plates, inside the same tank in relation to the separation requirements.

The coalescence-separation apparatus thus conceived can undergo numerous modifications and variants, all included in the invention; furthermore, all the details can be substituted by technically equivalent elements. In practice, the materials used can vary according to technical requirements.

The invention claimed is:

1. An apparatus for the coalescence-separation of a mixture comprising two fluid phases mutually at least partially immiscible and with a different specific density, comprising:
    a tubular body closed at opposite ends, of which, considering the apparatus in the configuration of use, one is higher than the other,
    at least one inlet mouth of the mixture to be separated which is defined on the side surface of said tubular body, at least one outlet mouth of the fluid phase with a lower specific density separated from said mixture which is defined close to the end of said tubular body at an upper height, at least one outlet mouth of the fluid phase with a greater specific density separated from said mixture which is defined close to the end of said tubular body at a lower height and
    at least one set of coalescence plates which is housed inside said tubular body with said coalescence plates arranged mutually parallel and one upon the other at a defined distance forming a respective flow and separation channel of said mixture,
    wherein each of said coalescence plates has a flow plate of said mixture which is tilted by an angle α with respect to a plane orthogonal to the longitudinal axis (A) of said tubular body and which has a lower edge facing the end of said tubular body at a lower height and in fluid communication with a distribution channel of the mixture to be separated, which is defined inside said tubular body and is in fluid communication with said at least one inlet mouth, and an upper edge facing the end of said tubular body at an upper height and in fluid communication with an outflow channel of the fluid phase with a greater specific density, which is defined in said tubular body and is in fluid communication with at least said outlet mouth of said fluid phase with a greater specific density, above said set of coalescence plates, being defined an accumulation compartment of the fluid phase with a lower density in fluid communication with said respective outlet mouth, and wherein
    the upper edge of each of said coalescence plates extends into a lip tilted with respect to said flow plate defining a groove with a concavity facing the end of said tubular body at a lower height, for the accumulation of the fluid phase with a lower density and for favouring the outflow of said fluid phase with a greater density, a plurality of through holes being defined close to the transition area between said lip and said plate of each of said coalescence plates, for the separation of the fluid phase with a lower specific density from the mixture flowing in the flow channel defined between each of said coalescence plates and the coalescence plate immediately below it and its passage in the flow channel defined between said coalescence plate and the coalescence plate immediately above it.

2. The apparatus according to claim 1, wherein an angle β of 90° is defined between said lip and said flow plate.

3. The apparatus according to claim 1, wherein each of said coalescence plates has a truncated-conical form internally hollow and open in correspondence with the larger base and smaller base.

4. The apparatus according to claim 3, wherein each of said coalescence plates is positioned inside said tubular body with the larger base facing said end of the tubular body at a lower height and the smaller base facing said end of the tubular body at an upper height, said flow plate being defined by the side surface of said truncated-cone and said upper edge and lower edge being defined by the edge of said smaller base and the edge of said larger base respectively.

5. The apparatus according to claim 4, wherein said coalescence plates are positioned substantially coaxially with respect to said tubular body with the lower edge at a distance from the internal side surface of said tubular body, the space delimited by the upper edges of said coalescence plates defining said outflow channel and the annular space delimited by the internal side surface of said tubular body and the lower edge of said coalescence plates defining said distribution channel.

6. The apparatus according to claim 4 further comprising an outflow duct which is positioned inside said outflow channel coaxially with respect to said tubular body and that it is open at opposite ends, of which one end faces the end of said tubular body at an upper height and is in fluid communication with said outlet mouth of the fluid phase with a lower specific density and the other end faces the end of said tubular body at a lower height and is in fluid communication with said outlet mouth of the fluid phase with a greater specific density, wherein at least one upper hole is defined close to said end of the outflow duct facing the end of said tubular body at an upper height, which puts said accumulation compartment in fluid communication with the interior of said outflow duct and wherein at least one lower hole is defined close to said end of the outflow duct facing the end of said tubular body at a lower height, which puts said outlet channel in fluid communication with the interior of said outflow duct.

7. The apparatus according to claim 1, wherein each of said coalescences plates has a flow plate with a substantially planar form.

8. The apparatus according to claim 1, wherein the distance between two subsequent coalescence plates ranges from 2 mm to 5 mm.

9. The apparatus according to claim 1, further comprising a containment tank in whose interior there is a chamber in which at least one of said tubular bodies is housed, wherein the at least one inlet mouth of said tubular body is in fluid communication with said chamber and wherein said tank comprises at least one inlet opening into said chamber of the mixture to be separated which, under conditions of use, is positioned at a lower height with respect to the outlet mouth of said tubular body of the fluid phase with a lower specific density, at least a first discharge opening which is in fluid communication with the outlet mouth of said tubular body of the fluid phase with a greater specific density separated from said mixture and at least a second discharge opening of the fluid phase with a lower specific density which is in fluid communication with said chamber, and which is positioned at an upper height with respect to said inlet opening, the outlet mouth of said tubular body of said fluid phase with a lower specific density resulting in said chamber.

10. An apparatus for the coalescence-separation of a mixture comprising two fluid phases mutually at least partially immiscible and with a different specific density, comprising:

a tubular body closed at opposite ends, of which, considering the apparatus in the configuration of use, one is higher than the other, at least one inlet mouth of the mixture to be separated which is defined on the side surface of said tubular body, at least one outlet mouth of the fluid phase with a lower specific density separated from said mixture which is defined close to the end of said tubular body at an upper height, at least one outlet mouth of the fluid phase with a greater specific density separated from said mixture which is defined close to the end of said tubular body at a lower height and at least one set of coalescence plates which is housed inside said tubular body with said coalescence plates mutually arranged parallel and one upon the other at a defined distance forming a respective flow and separation channel of said mixture, wherein each of said coalescence plates has a flow plate of said mixture which is tilted by an angle α with respect to a plane orthogonal to the longitudinal axis (A) of said tubular body and which has a lower edge facing the end of said tubular body at a lower height and in fluid communication with a distribution channel of the mixture to be separated, which is defined inside said tubular body and is in fluid communication with said at least one inlet mouth, and an upper edge facing the end of said tubular body at an upper height and in fluid communication with an outflow channel of the fluid phase with a greater specific density, which is defined in said tubular body and is in fluid communication with at least said outlet mouth of said fluid phase with a greater specific density, above said set of coalescence plates, being defined an accumulation compartment of the fluid phase with a lower density in fluid communication with said respective outlet mouth, wherein each of said coalescence plates has a truncated-conical form internally hollow and open in correspondence with the larger base and smaller base, and wherein the upper edge of each of said coalescence plates extends into a lip tilted with respect to said flow plate defining a groove with a concavity facing the end of said tubular body at a lower height, for the accumulation of the fluid phase with a lower density and for favouring the outflow of said fluid phase with a greater density.

11. The apparatus according to claim 10, wherein each of said coalescence plates is positioned inside said tubular body with the larger base facing said end of the tubular body at a lower height and the smaller base facing said end of the tubular body at an upper height, said flow plate being defined by the side surface of said truncated-cone and said upper edge and lower edge being defined by the edge of said smaller base and the edge of said larger base respectively.

12. The apparatus according to claim 11, wherein said coalescence plates are positioned substantially coaxially with respect to said tubular body with the lower edge at a distance from the internal side surface of said tubular body, the space delimited by the upper edges of said coalescence plates defining said outflow channel and the annular space delimited by the internal side surface of said tubular body and the lower edge of said coalescence plates defining said distribution channel.

13. The apparatus according to claim 11, further comprising an outflow duct which is positioned inside said outflow channel coaxially with respect to said tubular body and that it is open at opposite ends, of which one end faces the end of said tubular body at an upper height and is in fluid communication with said outlet mouth of the fluid phase with a lower specific density and the other end faces the end of said tubular body at a lower height and is in fluid communication with said outlet mouth of the fluid phase with a greater specific density, wherein at least one upper hole is defined close to said end of the outflow duct facing the end of said tubular body at an upper height, which puts said accumulation compartment in fluid communication with the interior of said outflow duct and wherein at least one lower hole is defined close to said end of the outflow duct facing the end of said tubular body at a lower height, which puts said outlet channel in fluid communication with the interior of said outflow duct.

14. The apparatus according to claim 10, wherein an angle β of 90° is defined between said lip and said flow plate.

15. The apparatus according to claim 10, wherein a series of through holes is defined close to the transition area between said lip and said plate of each of said coalescence plates, for the separation of the fluid phase with a lower specific density from the mixture flowing in the flow channel defined between each of said coalescence plates and the coalescence plate immediately below it and its passage in the flow channel defined between said coalescence plate and the coalescence plate immediately above it.

16. The apparatus according to claim 10, wherein the distance between two subsequent coalescence plates ranges from 2 mm to 5 mm.

17. The apparatus according to claim 10, wherein said angle α ranges from 30° to 60°.

18. The apparatus according to claim 10, further comprising a plurality of said inlet mouths distributed along a perimetric line of said tubular body.

19. The apparatus according to claim 10, further comprising at least one pair of said sets of coalescence plates arranged in series with respect to each other inside said tubular body.

* * * * *